(12) United States Patent
Acuña et al.

(10) Patent No.: US 10,313,214 B2
(45) Date of Patent: ***Jun. 4, 2019

(54) CROSS-TENANT ANALYSIS OF SIMILAR STORAGE ENVIRONMENTS TO RECOMMEND STORAGE POLICY CHANGES

(71) Applicant: International Business Machines Corporation, Armonk, NY (US)

(72) Inventors: Jorge D. Acuña, Vail, AZ (US);
Pankaj S. Bavishi, Pune (IN);
Dachuan Huang, Columbus, OH (US);
Rakesh Jain, San Jose, CA (US);
Ramani R. Routray, San Jose, CA (US); Yang Song, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/956,650

(22) Filed: Apr. 18, 2018

(65) Prior Publication Data

US 2018/0241652 A1    Aug. 23, 2018

Related U.S. Application Data

(63) Continuation of application No. 14/838,302, filed on Aug. 27, 2015, now Pat. No. 10,009,243.

(51) Int. Cl.
*H04L 12/24* (2006.01)
*H04L 12/26* (2006.01)
*H04L 29/08* (2006.01)

(52) U.S. Cl.
CPC .......... *H04L 43/08* (2013.01); *H04L 67/1097* (2013.01); *H04L 41/085* (2013.01)

(58) Field of Classification Search
CPC .... H04L 43/08; H04L 67/1097; H04L 41/085
(Continued)

(56) References Cited

U.S. PATENT DOCUMENTS

| | | |
|---|---|---|
| 8,156,281 B1 | 4/2012 | Grosner et al. |
| 10,009,243 B2 | 6/2018 | Acuna et al. |

(Continued)

OTHER PUBLICATIONS

List of IBM Patents or Patent Applications Treated as Related.
(Continued)

*Primary Examiner* — Ario Etienne
*Assistant Examiner* — Elizabeth Kassa
(74) *Attorney, Agent, or Firm* — Zilka-Kotab, P.C.

(57) ABSTRACT

In one embodiment, a method includes determining a first set of similarity metrics for a first storage environment, the first set of similarity metrics being based on predetermined parameters related to the first storage environment, at least one of the predetermined parameters being relating to a redundancy of connections and devices in the first storage environment. In addition, the method includes obtaining a second set of similarity metrics for a second storage environment. Also, the method includes determining that the second storage environment is similar to the first storage environment by calculating a similarity measurement score between the sets of similarity metrics for the first and second storage environments. Moreover, the method includes re-aligning the first storage environment according to one or more identified aspects of the second storage environment that improve performance of the first storage environment.

20 Claims, 5 Drawing Sheets

(58) Field of Classification Search
USPC .......................................................... 709/224
See application file for complete search history.

(56) References Cited

U.S. PATENT DOCUMENTS

| | | |
|---|---|---|
| 2004/0054656 A1 | 3/2004 | Leung et al. |
| 2005/0033757 A1 | 2/2005 | Greenblatt et al. |
| 2012/0317249 A1 | 12/2012 | Salsburg et al. |
| 2013/0073806 A1 | 3/2013 | Xavier et al. |
| 2013/0191531 A1 | 7/2013 | Kruglick |
| 2013/0283058 A1 | 10/2013 | Fiske et al. |
| 2014/0280100 A1 | 9/2014 | Chau |
| 2015/0082432 A1 | 3/2015 | Eaton et al. |
| 2017/0063654 A1 | 3/2017 | Acuna et al. |

OTHER PUBLICATIONS

Acuna et al., U.S. Appl. No. 14/838,302, filed Aug. 27, 2015.
Non-Final Office Action from U.S. Appl. No. 14/838,302, dated Aug. 29, 2017.
Notice of Allowance from U.S. Appl. No. 14/838,302, dated Feb. 22, 2018.

CROSS-TENANT ANALYSIS OF SIMILAR STORAGE ENVIRONMENTS TO RECOMMEND STORAGE POLICY CHANGES

BACKGROUND

The present invention relates to analysis of a storage environment, and more specifically, this invention relates to performing cross-tenant analysis of similar storage environments to recommend storage policy changes.

In a storage service delivery environment, different service accounts, or tenants, usually have different storage environments in terms of hardware configuration, number of devices, the storage management policies, etc. Each storage administrator is able to determine the account-specific policies and configurations for his or her own storage environment. For example, account A can specify that all volumes should be compressed and use thin-provisioning techniques, whereas account B specifies that all volumes must follow a specific storage-tier policy. From a storage administrator's viewpoint, it is also valuable to know how his or her storage environment performs compared to other storage environments, especially those with similar settings and configurations from a storage perspective. However, currently, such a comparison is not possible.

BRIEF SUMMARY

In one embodiment, a system includes a processing circuit and logic integrated with the processing circuit, executable by the processing circuit, or integrated with and executable by the processing circuit. The logic causes the processing circuit to determine a first set of similarity metrics for a first storage environment, the first set of similarity metrics being based on a plurality of predetermined parameters from the first storage environment, the plurality of predetermined parameters including parameters relating to a redundancy of connections and devices in the first storage environment. The logic also causes the processing circuit to obtain one or more second sets of similarity metrics from second storage environments that correspond with the first storage environment. In addition, the logic causes the processing circuit to calculate a similarity measurement score between the first set of similarity metrics for the first storage environment and a second set of similarity metrics for each of the second storage environments individually. Also, the logic causes the processing circuit to determine a set of similar storage environments from amongst the second storage environments based on the similarity measurement scores. Moreover, the logic causes the processing circuit to re-align the first storage environment according to one or more identified aspects that improve performance of the first storage environment by mimicking a configuration of at least one of the second storage environments.

In another embodiment, a system includes a processing circuit and logic integrated with the processing circuit, executable by the processing circuit, or integrated with and executable by the processing circuit. The logic causes the processing circuit to determine a first set of similarity metrics for a first storage environment. The logic also causes the processing circuit to obtain one or more second sets of similarity metrics from second storage environments that correspond with the first storage environment. In addition, the logic causes the processing circuit to calculate a similarity measurement score between the first storage environment and each of the second storage environments. Also, the logic causes the processing circuit to determine a set of similar storage environments from amongst the second storage environments based on the similarity measurement scores. Additionally, the logic causes the processing circuit to compare benchmark metrics for the first storage environment with benchmark metrics for each of the storage environments in the set of similar storage environments, the benchmark metrics indicating one or more desired aspects of the first storage environment. The logic also causes the processing circuit to ascertain relative performance of the first storage environment to the set of similar storage environments in regard to the one or more desired aspects based on comparing the benchmark metrics for the first storage environment with the benchmark metrics for each of the storage environments in the set of similar storage environments. Moreover, the logic causes the processing circuit to re-align the first storage environment according to one or more identified aspects that improve performance of the first storage environment by mimicking a configuration of at least one of the set of similar storage environments.

In yet another embodiment, a method includes determining a first set of similarity metrics for a first storage environment, the first set of similarity metrics being based on predetermined parameters related to the first storage environment, at least one of the predetermined parameters being relating to a redundancy of connections and devices in the first storage environment. In addition, the method includes obtaining a second set of similarity metrics for a second storage environment. Also, the method includes determining that the second storage environment is similar to the first storage environment by calculating a similarity measurement score between the sets of similarity metrics for the first and second storage environments. Moreover, the method includes re-aligning the first storage environment according to one or more identified aspects of the second storage environment that improve performance of the first storage environment.

Other aspects and embodiments of the present invention will become apparent from the following detailed description, which, when taken in conjunction with the drawings, illustrate by way of example the principles of the invention.

DETAILED DESCRIPTION

Figure 1:
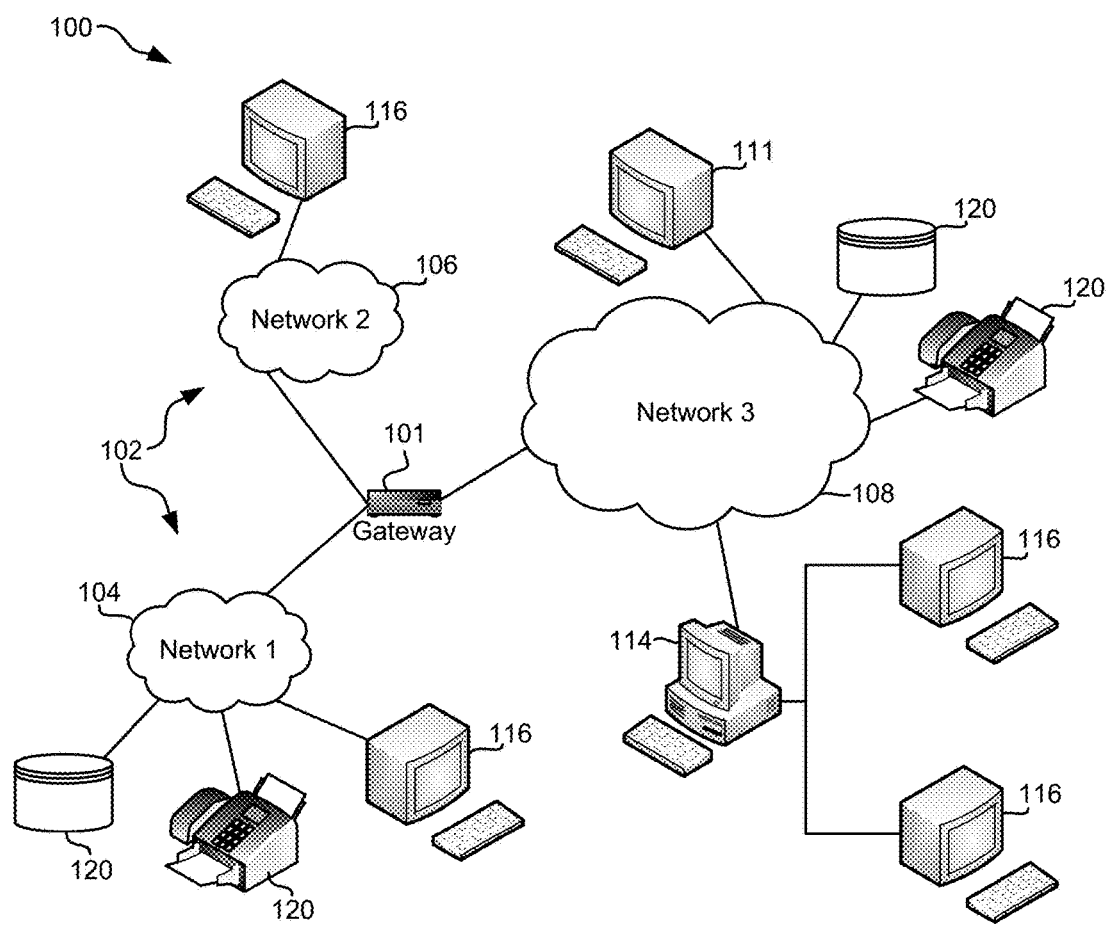
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for making storage management policy recommendations based on cross-tenant comparisons of storage environments.

In one general embodiment, a method includes determining a first set of similarity metrics for a first storage environment, obtaining one or more second sets of similarity metrics from second storage environments that correspond with the first storage environment, calculating a similarity measurement score between the first storage environment and each of the second storage environments, and determining a set of similar storage environments from amongst the second storage environments based on the similarity measurement scores.

In another general embodiment, a computer program product includes a computer readable storage medium having program instructions embodied therewith. The embodied program instructions are executable by a processor to cause the processor to determine, by the processor, a plurality of predetermined parameters from a first storage environment. The embodied program instructions are also executable to determine, by the processor, a configuration of the first storage environment based at least in part on the plurality of predetermined parameters. Moreover, the embodied program instructions are executable to determine, by the processor, a first set of similarity metrics based on the plurality of predetermined parameters and the configuration of the first storage environment. In addition, the embodied program instructions are executable to obtain, by the processor, one or more second sets of similarity metrics from second storage environments that correspond with the first set of similarity metrics, and calculate, by the processor, at least one first similarity score, each similarity score being based on similarity between a first similarity metric and one or more corresponding second similarity metrics from the one or more second sets of similarity metrics. Additionally, the embodied program instructions are executable to calculate, by the processor, one or more similarity measurement scores, each similarity measurement score corresponding to one of the second storage environments, wherein each similarity measurement score is based on combining all first similarity scores corresponding to the second storage environment according to a first algorithm, and determine, by the processor, a set of similar storage environments from amongst the second storage environments based on the one or more similarity measurement scores.

In another general embodiment, a computer program product includes a computer readable storage medium having program instructions embodied therewith. The embodied program instructions are executable by a processor to cause the processor to determine a first set of similarity metrics for a first storage environment and obtain one or more second sets of similarity metrics from second storage environments that correspond with the first storage environment. Additionally, the embodied program instructions are executable to calculate a similarity measurement score between the first storage environment and each of the second storage environments and determine a set of similar storage environments from amongst the second storage environments based on the similarity measurement scores. Moreover, the embodied program instructions are executable to compare benchmark metrics for the first storage environment with benchmark metrics for each of the storage environments in the set of similar storage environments, and output a recommendation to improve the first storage environment based on a comparison of the benchmark metrics for the first storage environment with the benchmark metrics for each of the storage environments in the set of similar storage environments.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
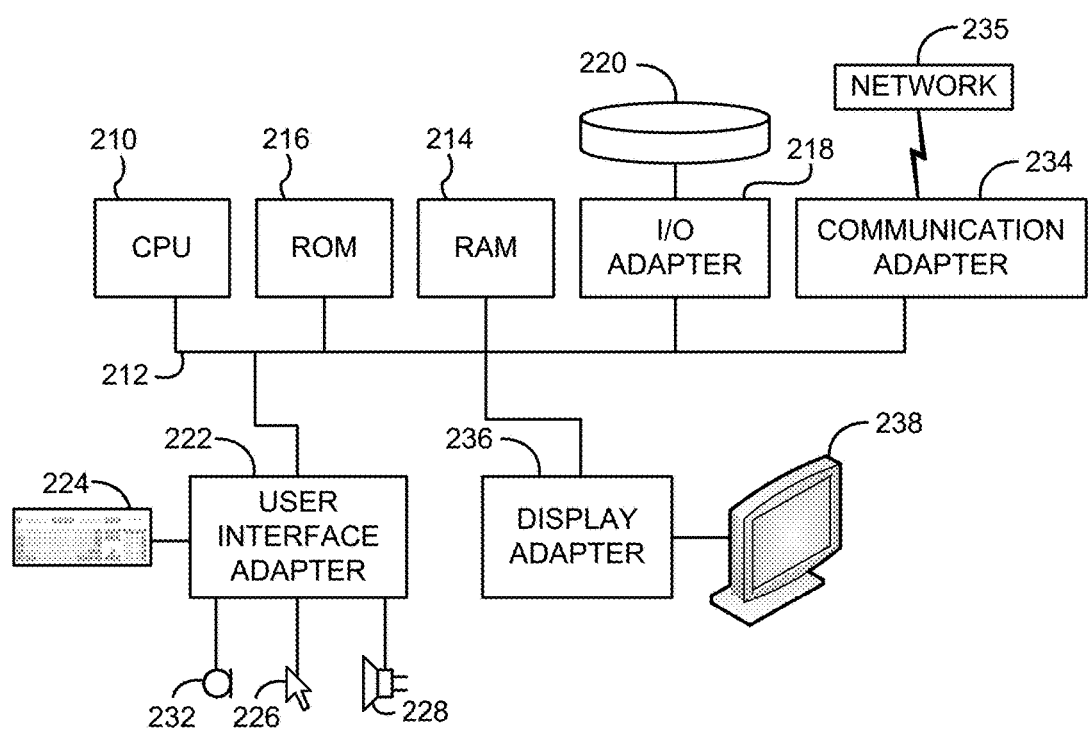
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
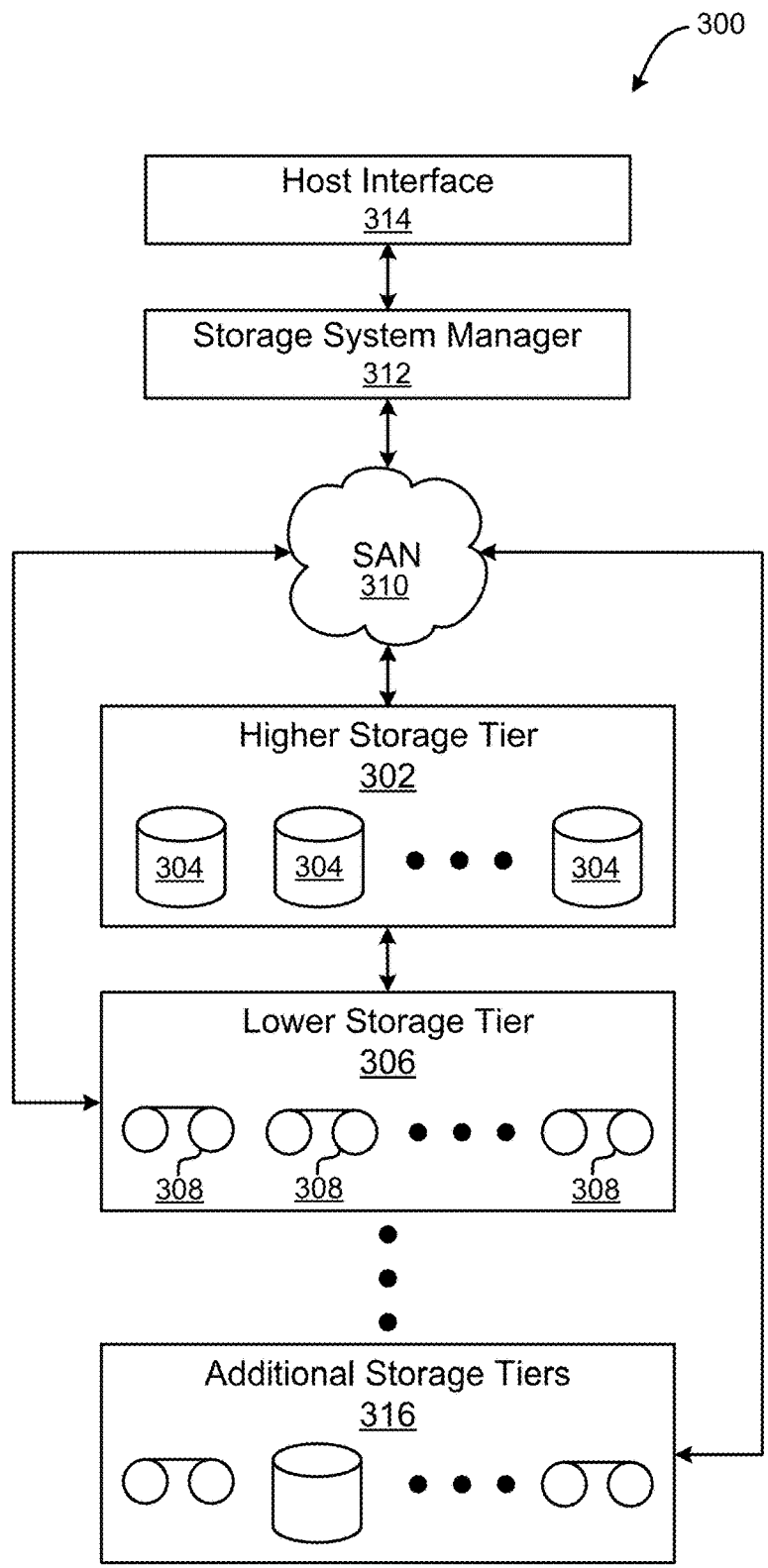
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Currently, each tenant or account which utilizes a specific storage environment is not capable of determining similar storage environments in order to ascertain where improvements may be made. However, according to methods presented herein, in various embodiments, each tenant (or the associated storage administrator) in a multi-tenant storage analytics platform may register his or her account (which provides a facility to store information and details about his or her storage environment) and to compare his or her specific storage environment with similar storage environments of other accounts, in order to gauge the condition/health status of his or her storage configurations and policies by comparing them with other relevant storage environments.

Figure 4:
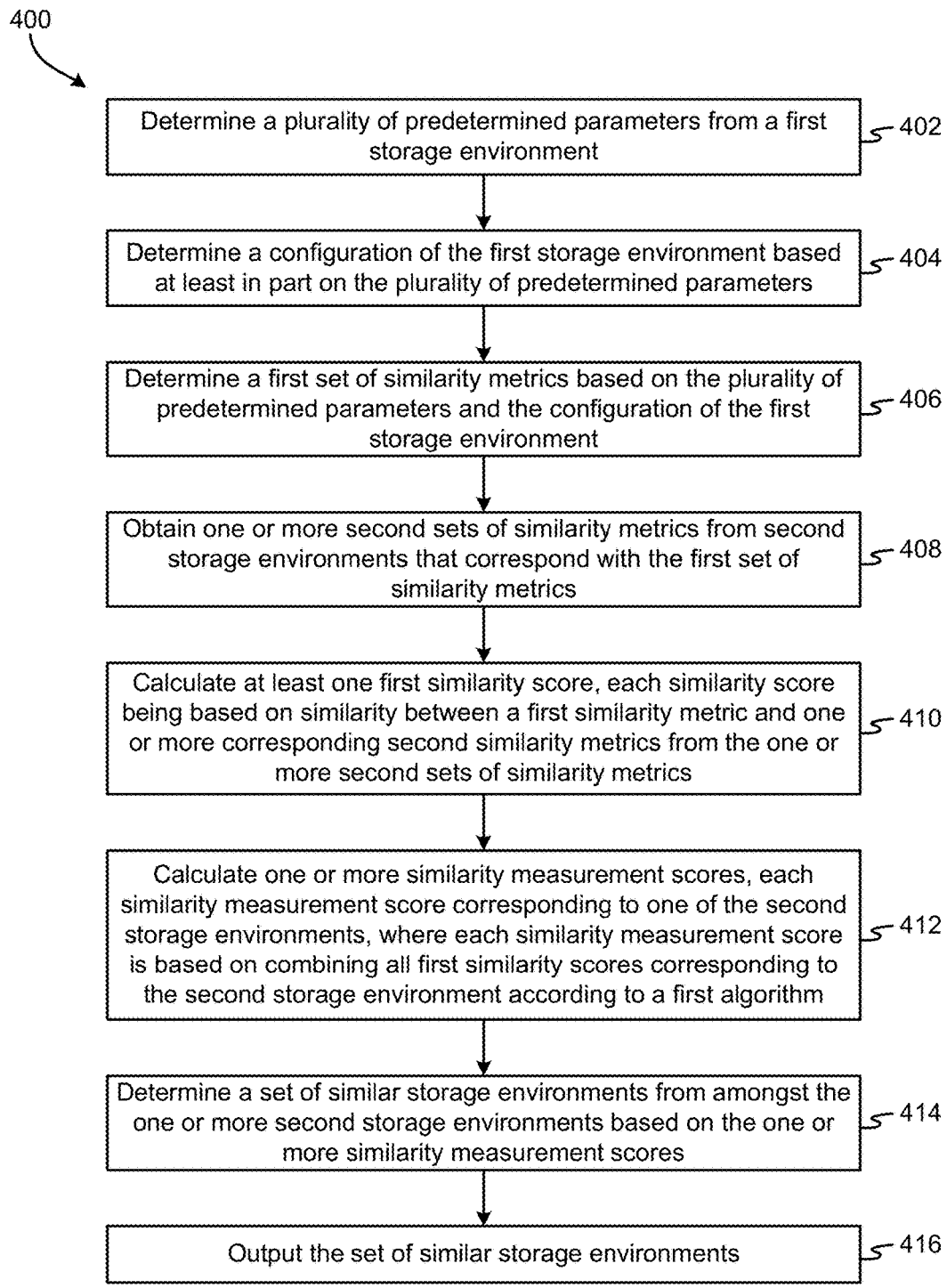
FIG. 4 shows a flowchart of a method according to one embodiment.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a processor, a storage environment controller, an application installed on a device within a storage environment, or some other device having one or more processors therein. The processor, e.g., processing circuit(s), chip(s), and/or module(s) implemented in hardware and/or software, and preferably having at least one hardware component, may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a plurality of predetermined parameters from a first storage environment are determined. A storage environment is a system that is configured to store data. One non-limiting example of a storage environment is the storage system 300 of FIG. 3. To store data, the storage environment may include one or more of the following components: physical storage devices, virtual storage devices, switches, routers, controllers, networking and connectivity devices such as physical links, ports, logical forwarding and routing tables, etc. Furthermore, the storage environment may utilize an operating system (OS) that is configured specifically for storage systems, or a more general OS provided by any vendor. The OS may adhere to a specific structure, such as MICROSOFT WINDOWS, UNIX, IBM z/OS, LINUX, etc.

The plurality of predetermined parameters may comprise any relevant, useful, and ascertainable criteria that describes and/or represents any aspect of the first storage environment. In one embodiment, the plurality of predetermined parameters may be selected from: parameters relating to devices in the first storage environment, parameters relating to connectivity between the devices in the first storage environment, parameters relating to the geographical location of the first storage environment and the various devices therein, parameters relating to a purpose and/or industry sector of the first storage environment (e.g., finance, IT, healthcare, etc.), and parameters relating to types of workloads which will be handled by the first storage environment and the various devices therein (e.g., archival, transactional, etc.).

Some exemplary parameters include, but are not limited to, a number, a count, a size, a speed, a type, a manufacturer, etc. These parameters may be collected for any aspect of the first storage environment. Some exemplary aspects of the first storage environment include, but are not limited to, physical devices of the first storage environment, virtual devices of the first storage environment, connectivity of the first storage environment, networking configuration of the first storage environment, a latency of data access requests for the first storage environment, software of the first storage environment and/or particular devices and components of the first storage environment, firmware of the first storage environment and/or particular devices and components of the first storage environment, applications installed in the first storage environment and/or particular devices and components of the first storage environment, and configured functionality of the first storage environment and/or particular devices and components of the first storage environment (such as optimization applications, encryption capability, protection functionality, security features, back-up routines, duplication routines, remote-access capability, etc.).

Some exemplary parameters relating to devices in the first storage environment include, but are not limited to, operating system of each device, storage capacity of each device, uptime for each device, downtime for each device, access speed for each device, latency of for each device, failure rate for each device, age for each device, cost for each device, etc.

In another embodiment, the parameters relating to devices in the first storage environment include, but are not limited to, a number of virtual and physical devices in the first storage environment (separately and combined), a storage capacity of each of the virtual and physical devices in the first storage environment, a type of each of the virtual and physical devices in the first storage environment, and a speed of each of the virtual and physical devices in the first storage environment.

Some exemplary parameters relating to connectivity between the devices in the first storage environment include, but are not limited to, type of each connection or link, installation date of each connection or link, downtime of each connection or link, uptime of each connection or link, latency of each connection or link, rated transfer speed of each connection or link, installation location of each connection or link, devices which are connected by each connection or link, etc.

In another embodiment, the parameters relating to the connectivity between the devices in the first storage environment may include, but are not limited to, a number of links between physical devices in the first storage environment, speed information (e.g., download speed, upload speed, latency, etc.) for each of the links between the physical devices in the first storage environment, downtime information (e.g., amount of time not functioning versus functioning properly over a period of time) for each of the links between the physical devices in the first storage environment, and efficiency information (e.g., usage of the link versus available bandwidth) for each of the links between the physical devices in the first storage environment.

Referring again to FIG. 4, in one embodiment, method 400 may further include providing a user interface, such as on a display of the first storage environment, in order to obtain the plurality of predetermined parameters from a user. The user interface may be configured to specify the plurality of predetermined parameters to be entered by a storage administrator of the first storage environment, or some other suitable operator or user as would be understood by one of skill in the art. The user interface may include a list of the plurality of predetermined parameters, or more or less parameters as desired by a designer of the user interface, with a plurality of corresponding fields present to allow the storage administrator to enter the applicable parameter. Any field which is filled in by the storage administrator may then be parsed to recognize the plurality of parameters that correspond to the first storage environment, and at least some of the plurality of predetermined parameters may be received to be used in further calculations.

In one embodiment, the plurality of predetermined parameters may be determined by querying a local storage management application (that has access to the first storage environment) to obtain the plurality of predetermined parameters. Because a local storage management application is configured to manage all aspects of a storage environment, these values should be readily available from a database, repository, or some other storage structure accessible to such an application.

In operation 404, a configuration of the first storage environment is determined based at least in part on the plurality of predetermined parameters. The configuration of the first storage environment may be characterized as an overall description of the first storage environment, including but not limited to a purpose of the first storage environment (e.g., banking, cloud storage, manufacturing, data mining, etc.), how each device in the first storage environment is interconnected (including, but not limited to, connection types, connection speeds, redundancy of connections, redundancy of devices, etc.), information regarding storage tiers (e.g., the presence of storage tiers in the first storage environment, a number of storage tiers, a function for each storage tier, a size of each storage tier, etc.), information regarding system setup (e.g., a number of subsystems, access points for the first storage environment, etc.), an OS of a controller for the first storage environment, etc.

In one embodiment, the configuration of the first storage environment may be determined based on certain predetermined information such as: information relating to a local storage management application of the first storage environment, a number of subsystems in the first storage environment, firmware information for each device in the first storage environment, software information for each device in the first storage environment, encryption information for the first storage environment, protection information for the first storage environment, security information for the first storage environment, backup and/or redundancy information for the first storage environment, etc.

The configuration of first storage environment may then be used to determine similarities between the first storage environment and one or more second storage environments in which the configuration has also been determined, such as by using a set of similarity metrics.

In operation 406, a first set of similarity metrics are determined based on the plurality of predetermined parameters and the configuration of the first storage environment. A similarity metric, as used herein, refers to a representation that describes and/or indicates a certain aspect of a storage system such that the certain aspect of the storage environment is able to be compared to the same aspect of another storage environment. The representation may be any number, ratio, description, and/or classification, that may be used to represent the aspect of the storage environment. In one example, one or more words may be used to signify the aspect, such as a similarity metric based on OS of the storage environment that may be represented by the words which signify the OS, such as MICROSOFT WINDOWS, LINUX, etc. In another example, the representation may be a number, such as a similarity metric based on a number of solid-state storage devices (SSDs) that may be represented by the number of such devices in the storage environment, e.g., 10, 100, 250, etc. In yet another example, the representation may be a ratio, such as when comparing used storage space to overall storage capacity, which may be represented as the ratio of (used storage space/storage space to overall storage capacity) for the storage environment.

The first set of similarity metrics may include any similarity metrics (measurable aspects of storage environments) that may be useful in comparing the first storage environment to the one or more second storage environments. Some exemplary similarity metrics include, but are not limited to, storage capacity, used storage space, available storage space, number of hosts, number of subsystems, number of devices (physical, virtual, and a combination thereof), number of storage devices (which does not include switches, routers, controllers, and other connectivity and/or management devices), number of unique storage device types (based on different manufacturers, different size, different access speed, etc.), number of inoperable and/or broken devices, links, sectors, etc., downtime of the first storage environment and/or a portion thereof over a predetermined period of time, OS of the first storage environment, storage device firmware version, purpose of the first storage environment, etc.

In operation 408, one or more second sets of similarity metrics from second storage environments that correspond with the first set of similarity metrics are obtained. The one or more second sets of similarity metrics are calculated based on parameters and configuration(s) of the one or more second storage environments. The second sets of similarity metrics may, in a further embodiment, be calculated in a similar fashion to the first set of similarity metrics, except based on parameters and a configuration of a second storage environment.

The second storage environments are other already existing (or once existing) storage environments that include at least one similar aspect as the first storage environment. The second sets of similarity metrics may be obtained from a database, spreadsheet, cloud-based repository, etc., that is remotely accessible to allow importation of the second sets of similarity metrics in order to perform the comparison as described herein. The number of second sets of similarity metrics that are obtained may be limited to a predetermined number, such as 10, 25, 50, 100, etc., in order to preserve processing power of the system executing method 400, and/or to ensure that the amount of time necessary to perform the comparison is not greater than a reasonable amount of time, such as 1 second, 10 seconds, 30 seconds, 1 minute, 10 minutes, 60 minutes, etc.

In operation 410, at least one first similarity score is calculated using any suitable algorithm known in the art for the calculation of similarity scores, such as a ratio calculation (e.g., first metric/second metric, second metric/first metric), an absolute difference calculation (e.g., first metric−second metric, second metric−first metric), a difference ratio calculation (e.g., (first metric−second metric)/first metric, (second metric−first metric)/first metric, (first metric−second metric)/second metric, (second metric −first metric)/second metric), a combined metric calculation (e.g., (first metric A*first metric B)/(second metric A*second metric B)), a summation, a weighted summation, etc.

Each similarity score is based on a similarity between a first similarity metric (corresponding to an aspect of the first storage environment) and one or more corresponding second similarity metrics from the one or more second sets of similarity metrics (corresponding to the same aspect of the one or more second storage environments). A second similarity metric is compared (using some predetermined algorithm or comparison technique known in the art) with the first similarity metric from each second storage environment which shares the particular aspect with the first storage environment on which the similarity metric is based.

For example, when the first storage environment and five different second storage environments all utilize HDDs for data storage, a similarity metric may be based on a total capacity of HDD storage in each storage environment. Assuming that the first similarity metric indicates that the first storage environment encompasses 150 TB of HDD storage capacity, and the similarity metrics from the five different second storage environments are 100 TB, 250 TB, 5 TB, 500 TB, and 150 TB, and that the similarity score is calculated based on a ratio of second storage over first storage, a similarity score between the first storage environment and each of the five different second storage environments may be calculated for the total HDD storage capacity as follows: 100/150=0.67, 200/150=1.33, 5/150=0.33, 500/150=3.33, and 150/150=1.0. According to these similarity scores, 0.67, 1.33, 0.33, 3.33, and 1.0, one second storage environment is very similar (similarity score of 1.0), two second storage environments are relatively similar (similarity scores of 0.67 and 1.33) and two second storage environments are not similar (similarity scores of 3.33 and 0.33).

In this way, a similarity score for the first storage environment may be calculated for each particular aspect of interest of the first storage environment as compared to the same aspect of second storage environments, in order to ascertain which of the second storage environments share a similarity with the first storage environment, and approximately how similar the storage environments are in regard to the chosen aspect.

In one embodiment, a predefined set of similarity metrics may be selected for comparison with the second storage environments, with the predefined set of similarity metrics being selected to compare certain, desired aspects of the storage environments that are deemed to be most indicative of similarity between the environments. In a further embodiment, more than one predefined set of similarity metrics may be provided in a user interface, to allow a storage administrator (or other authorized user) to select which aspect(s) of the storage environment is most desired to be compared.

Some exemplary predefined set of similarity metrics may be based on comparing total storage capacity (where the similarity metrics are primarily focused on storage capacities and types), operating system (where the similarity metrics are primarily focused on ascertaining OS and compatibility between software/firmware/applications in the various storage environments), and configuration (where the similarity metrics are primarily focused on OS, storage controller, number of subsystems, and number of devices). Of course, one of skill in the art would be capable of envisioning many more predefined sets of similarity metrics based on many other aspects of the storage environments, and the choice of predefined sets of similarity metrics is not limited to those specifically discussed herein.

In operation 412, one or more similarity measurement scores are calculated using any algorithm known in the art. Each similarity measurement score corresponds to one of the second storage environments. Furthermore, each similarity measurement score is based on combining all first similarity scores corresponding to the second storage environment according to a first algorithm. Some exemplary first algorithms include, but are not limited to, one or two standard deviations from a mean or median, a summation, a weighted summation, an average, a weighted average, etc.

In this way, an overall similarity measurement score is calculated for each second storage environment that indicates an overall similarity between the particular second storage environment and the first storage environment. This similarity measurement score may be normalized according to some predetermined scale, such as 100%, out of 100, out of 1, etc., in order to provide a user the ability to intuitively understand a similarity between the first storage environment and one or more second storage environments.

The first algorithm may utilize any mathematical operations in determining the combination of the various similarity scores for a particular second storage environment, such as addition, multiplication, average, weighted average based on some predetermined more important aspects, etc.

In one example, assume that there are three storage environments: (A, B, C), with storage capacities of (8.3, 3.9, 1.7)TB and having subsystems numbering (96, 22, 52). Assume that "storage capacity" and "number of subsystems" are two similarity metrics selected to measure how similar the storage environments are to one another, and assume that storage environment A is the account of interest (first storage environment). For capacity, divide the capacity values for three accounts by the average pair-wise distance, which is 4.4, for normalization purposes, and the normalized capacity becomes (1.8863636, 0.8863636, 0.3863636). Similarly, the same normalization process is performed for "number of subsystems" to obtain the normalized vector as (1.945959, 0.445949, 1.054061). Next, calculate the numeric distance for the two normalized similarity metrics. For normalized capacity, the distances from A to B and C are (1.0, 1.5), whereas for normalized number of subsystems, the distances from A to B and C are (1.500010, 0.891898). Given the normalized distance for these two similarity metrics, a combination may be made using predetermined criteria. For example, the weight for capacity difference may be assumed as 2, whereas the weight for number of subsystems differences may be assigned as 1 (implying the capacity discrepancy is more important than the difference in number of subsystems). In this case, the combined weighted distance from A to B and C may be calculated as (3.50, 3.89). The inverse of the combined distance may be used as the combined similarity metric. Therefore, the final combined similarity measurement from storage environment A to storage environment B and storage environment C may be calculated as (0.2857143, 0.2570694). These values may then be used to determine similarity between the storage environments.

In operation 414, a set of similar storage environments are determined from amongst the one or more second storage environments based on the one or more similarity measurement scores. This determination may be based on some threshold, some absolute value difference, a user-adjustable criteria, etc.

For example, assuming that the similarity measurement scores between the first storage environment and five different second storage environments are normalized to 100% (being completely similar), these values could be quickly compared to determine similarity. Assuming that the similarity measurement scores between the first storage environment and five different second storage environments are: 23% for storage environment A, 55% for storage environment B, 45% for storage environment C, 89% for storage environment D, and 93% for storage environment E, it can be concluded that second storage environments D and E are most similar to the first storage environment. Furthermore, assuming that a threshold of 50% similar was in place, then storage environments B, D, and E would all qualify as "similar."

In operation 416, the set of similar storage environments are output. Any form of outputting may be used, such as displaying on a monitor or screen, printing to a tangible medium, such as paper, plastic, etc., indicating audibly, storing to a non-transitory computer readable storage medium, such as RAM, ROM, HDD, etc., or any other form of outputting known in the art.

Method 400 may further include, in one embodiment, determining a set of benchmark metrics, calculating all benchmark metrics from the set of benchmark metrics for the first storage environment and for each of the storage environments in the set of similar storage environments, and comparing the benchmark metrics for the first storage environment with the benchmark metrics for each of the storage environments in the set of similar storage environments using predetermined criteria.

The set of benchmark metrics may be selected (from amongst all possible benchmark metrics) to indicate a desired aspect of the first storage environment, and may be processed to compare the first storage environment with each of the second storage environments, in order to ascertain the relative performance of the first storage environment in regard to the selected aspects.

In another embodiment, method 400 may further include outputting at least one recommendation to improve the first storage environment based on a comparison of the benchmark metrics for the first storage environment with the benchmark metrics for each of the storage environments in the set of similar storage environments. The recommendation may be provided to any suitable user, such as a storage administrator of the first storage environment, printed out, displayed on a screen or display, or output in some other known fashion.

The recommendation may be further based on increasing the performance of the first storage environment in a way that mimics the performance of one or more of the second storage environments. For example, assuming that all other variables are equal, if a second storage environment uses a two tier configuration, and the first storage environment uses a single tier configuration, and the storage environment is 20% more efficient than the first storage environment, then it may be recommended to enact a two-tier configuration in the first storage environment in order to mimic the improved performance of the second storage environment.

In a further embodiment, method 400 may include re-aligning the first storage environment according to one or more identified aspects to improve the performance of the first storage environment by mimicking a configuration of one or more second storage environments.

Figure 5:
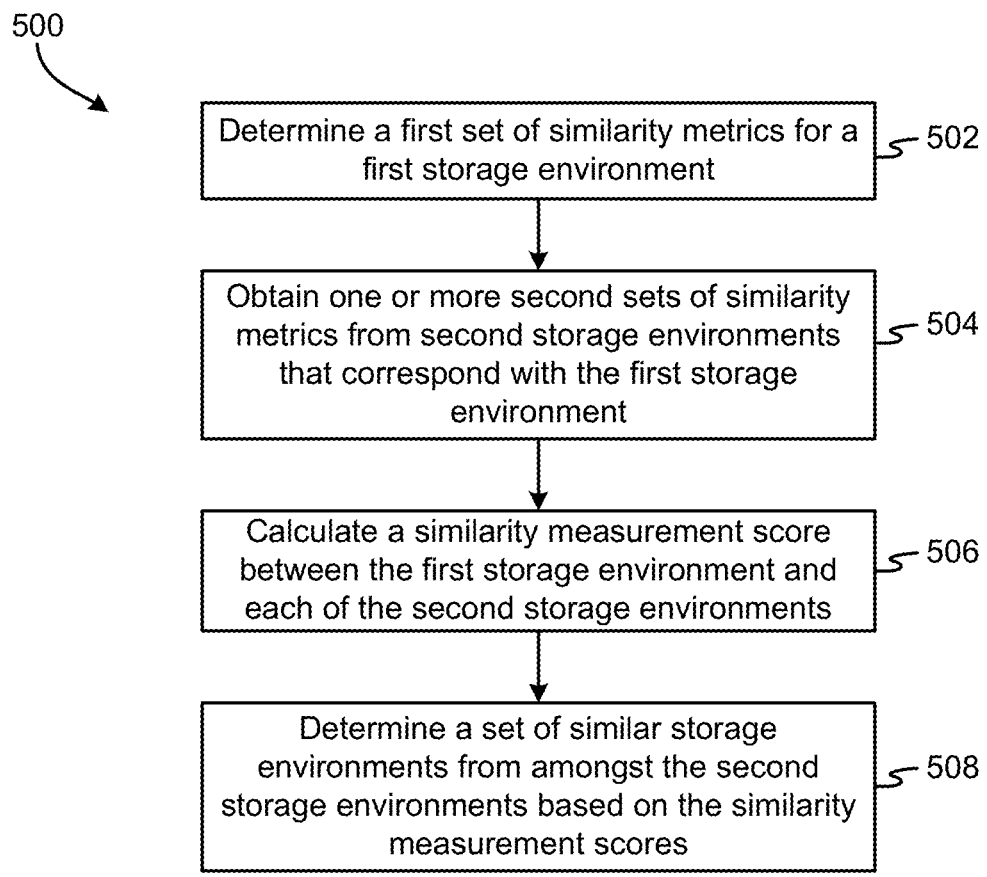
FIG. 5 shows a flowchart of a method according to one embodiment.

Now referring to FIG. 5, a flowchart of a method 500 is shown according to one embodiment. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, a storage environment controller, an application installed on a device within a storage environment, or some other device having one or more processors therein. The processor, e.g., processing circuit(s), chip(s), and/or module(s) implemented in hardware and/or software, and preferably having at least one hardware component, may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a first set of similarity metrics for a first storage environment are determined. The set of similarity metrics may be selected to ascertain particular aspects of the first storage environment to compare against other storage environments.

In operation 504, one or more second sets of similarity metrics from second storage environments are obtained that correspond with the first storage environment. These second sets of similarity metrics may be used to determine similarities between the first and each of the second storage environments. The set of similarity metrics may be selected from a pre-configured set of all possible similarity metrics applicable to the first storage environment, and/or obtained via a user-interface which allows a user to choose certain similarity metrics. Exemplary similarity metrics may include storage capacity size, number of hosts, different number of storage devices, number of subsystems, etc.

In operation 506, a similarity measurement score between the first storage environment and each of the second storage environments is calculated. The similarity measurement score may be calculated by determining similarity scores of multiple different aspects of the first storage environment, and combining the similarity scores into a single combined similarity measurement score using some known algorithm and/or combination technique, e.g., summation, weighted summation, etc.

In operation 508, a set of similar storage environments are determined from amongst the second storage environments based on the similarity measurement scores. A threshold (e.g., 50% similar, 75% similar, 90% similar, etc.) may be used to perform this determination, a top 10 most similar may be selected, a top 20 most similar, etc. In this way, it is ascertained which second storage environments are similar to the first storage environment, so that comparisons of the components, devices, and configuration of the environments may result in performance improvements to the first storage environment.

In one embodiment, method 500 may further include calculating benchmark metrics for the first storage environment and for each storage environment in the set of similar storage environments. In one embodiment, the benchmark metrics may be provided by a user. In another embodiment, these benchmark metrics may be selected, e.g., by a user, automatically based on a profile, etc., from a pre-configured set. Benchmark metrics may combine one or more similarity metrics or may be based on one or more similarity metrics to indicate more advanced aspects of the storage environment.

Some exemplary benchmark metrics include, but are not limited to, a ratio of compressed volumes (number of compressed volumes/total number of volumes, size of compressed volumes/size of total volumes, etc.), workload-to-storage-tier alignment (percentage of frequently accessed files ("hot") stored to lower tier(s), percentage of rarely accessed files ("cold") stored to high tier(s), I/O density of one or more tiers of the storage environment, IOPS/GB comparison, a ratio of properly placed hot files to properly placed cold files, etc.), overall capacity growth rate of the storage system, a ratio of thin-provisioned volumes to non-thin provisioned volumes, and reclaimable storage capacity (storage space that is allocated but unused, not accessed frequently, etc.). Of course, any conceivable benchmark metric known in the art may be used for comparison between the first storage environment and the similar second storage environments.

In a further embodiment, method 500 may also include comparing the benchmark metrics for the first storage environment with the benchmark metrics for each of the storage environments in the set of similar storage environments, such as by using predetermined criteria. The criteria may include any known comparison criteria known in the art, and may be based on the specific benchmark metrics utilized.

For example, the rank of "ratio of compressed volumes" of the first storage environment may be compared to the other similar storage environments. Furthermore, in an optional operation, at least one recommendation to improve the first storage environment may be determined and output. One such recommendation may be formatted as follows: "More than 70% of similar storage environments have feature X, would you like to enable it?"

Thus, method 500 may include outputting at least one recommendation to improve the first storage environment, such as to a storage administrator of the first storage environment. The recommendation(s) are based on improving the first storage environment based on a comparison of the benchmark metrics for the first storage environment with the benchmark metrics for each of the storage environments in the set of similar storage environments.

In a further embodiment, method 500 may include re-aligning the first storage environment according to one or more identified aspects to improve the performance of the first storage environment by mimicking a configuration of one or more second storage environments.

Any aspect of utilization and deployment of storage tiers in storage environments may be investigated and/or improved using the methods described herein in various embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
   a processing circuit; and
   logic integrated with the processing circuit, executable by the processing circuit, or integrated with and executable by the processing circuit, wherein the logic causes the processing circuit to:
   determine a first set of similarity metrics for a first storage environment, the first set of similarity metrics being based on a plurality of predetermined parameters from the first storage environment, the plurality of predetermined parameters comprising parameters relating to a redundancy of connections and devices in the first storage environment;
   obtain one or more second sets of similarity metrics from second storage environments that correspond with the first storage environment;
   calculate a similarity measurement score between the first set of similarity metrics for the first storage environment and a second set of similarity metrics for each of the second storage environments individually;
   determine a set of similar storage environments from amongst the second storage environments based on the similarity measurement scores; and
   re-align the first storage environment according to one or more identified aspects that improve performance of the first storage environment by mimicking a configuration of at least one of the second storage environments.

2. The system as recited in claim 1, wherein the logic further causes the processing circuit to:
   obtain benchmark metrics for the first storage environment and benchmark metrics for each storage environment in the set of similar storage environments, the benchmark metrics indicating one or more desired aspects of the first storage environment;
   compare the benchmark metrics for the first storage environment with the benchmark metrics for each of the storage environments in the set of similar storage environments individually using predetermined criteria; and
   ascertain relative performance of the first storage environment to the set of similar storage environments in regard to the one or more desired aspects based on comparing the benchmark metrics for the first storage environment with the benchmark metrics for each of the storage environments in the set of similar storage environments individually.

3. The system as recited in claim 2, wherein the logic further causes the processing circuit to:
   output a recommendation to improve the first storage environment based on the relative performance of the first storage environment to the set of similar storage environments,
   wherein the one or more identified aspects that improve performance of the first storage environment is based on the relative performance of the first storage environment to the set of similar storage environments.

4. The system as recited in claim 1, wherein the logic that causes the processing circuit to determine the first set of similarity metrics for the first storage environment further causes the processing circuit to:
   determine a configuration of the first storage environment based at least in part on the plurality of predetermined parameters,
   wherein the first set of similarity metrics are based on the plurality of predetermined parameters and the configuration of the first storage environment.

5. The system as recited in claim 4, wherein the logic further causes the processing circuit to:
   provide a user interface, the user interface specifying at least some of the plurality of predetermined parameters to be entered by a storage administrator of the first storage environment; and
   receive the at least some of the plurality of predetermined parameters via the user interface.

6. The system as recited in claim 4, wherein the logic further causes the processing circuit to query a local storage management application to obtain at least some of the plurality of predetermined parameters.

7. The system as recited in claim 4, wherein the plurality of predetermined parameters further include parameters selected from the group consisting of:
- parameters relating to devices in the first storage environment;
- parameters relating to connectivity between the devices in the first storage environment;
- parameters relating to a geographical location of the first storage environment and the devices in the first storage environment;
- parameters relating to a purpose and/or industry sector of the first storage environment; and
- parameters relating to types of workloads which will be handled by the first storage environment and the devices in the first storage environment.

8. The system as recited in claim 7, wherein the parameters relating to the devices in the first storage environment are selected from the group consisting of:
- a number of virtual and physical devices in the first storage environment;
- a storage capacity of each of the virtual and physical devices in the first storage environment;
- a type of each of the virtual and physical devices in the first storage environment; and
- a speed of each of the virtual and physical devices in the first storage environment.

9. The system as recited in claim 7, wherein the parameters relating to the connectivity between the devices in the first storage environment are selected from the group consisting of:
- a number of links between physical devices in the first storage environment;
- speed information for each of the links between the physical devices in the first storage environment;
- downtime information for each of the links between the physical devices in the first storage environment; and
- efficiency information for each of the links between the physical devices in the first storage environment.

10. The system as recited in claim 4, wherein the configuration of the first storage environment is determined based on information selected from the group consisting of:
- information relating to a local storage management application of the first storage environment;
- a number of subsystems in the first storage environment;
- firmware information for each device in the first storage environment;
- software information for each device in the first storage environment;
- encryption information for the first storage environment;
- protection information for the first storage environment;
- security information for the first storage environment;
- an operating system of a controller of the first storage environment; and
- backup information for the first storage environment.

11. A system, comprising:
- a processing circuit; and
- logic integrated with the processing circuit, executable by the processing circuit, or integrated with and executable by the processing circuit, wherein the logic causes the processing circuit to:
  - determine a first set of similarity metrics for a first storage environment;
  - obtain one or more second sets of similarity metrics from second storage environments that correspond with the first storage environment;
  - calculate a similarity measurement score between the first storage environment and each of the second storage environments;
  - determine a set of similar storage environments from amongst the second storage environments based on the similarity measurement scores;
  - compare benchmark metrics for the first storage environment with benchmark metrics for each of the storage environments in the set of similar storage environments, the benchmark metrics indicating one or more desired aspects of the first storage environment;
  - ascertain relative performance of the first storage environment to the set of similar storage environments in regard to the one or more desired aspects based on comparing the benchmark metrics for the first storage environment with the benchmark metrics for each of the storage environments in the set of similar storage environments; and
  - re-align the first storage environment according to one or more identified aspects that improve performance of the first storage environment by mimicking a configuration of at least one of the set of similar storage environments.

12. A method, comprising:
- determining a first set of similarity metrics for a first storage environment, the first set of similarity metrics being based on predetermined parameters related to the first storage environment, at least one of the predetermined parameters being relating to a redundancy of connections and devices in the first storage environment;
- obtaining a second set of similarity metrics for a second storage environment;
- determining that the second storage environment is similar to the first storage environment by calculating a similarity measurement score between the sets of similarity metrics for the first and second storage environments; and
- re-aligning the first storage environment according to one or more identified aspects of the second storage environment that improve performance of the first storage environment.

13. The method as recited in claim 12, comprising:
- obtaining benchmark metrics for the first storage environment and for the second storage environment; and
- comparing the benchmark metrics for the first storage environment with the benchmark metrics for the second storage environment using predetermined criteria.

14. The method as recited in claim 13, comprising:
- outputting a recommendation to improve the first storage environment based on a comparison of the benchmark metrics for the first storage environment with the benchmark metrics for the second storage environment.

15. The method as recited in claim 12, wherein the determining the first set of similarity metrics for the first storage environment comprises:
- determining the predetermined parameters from the first storage environment; and
- determining a configuration of the first storage environment based at least in part on the predetermined parameters,
- wherein the first set of similarity metrics are further based on the configuration of the first storage environment.

16. The method as recited in claim 15, wherein the determining the predetermined parameters is selected from the group consisting of:

providing a user interface, the user interface specifying at least some of the predetermined parameters to be entered by a user of the first storage environment and receiving the at least some of the predetermined parameters; and querying a local storage management application to obtain at least one of the predetermined parameters.

17. The method as recited in claim 15, wherein the predetermined parameters are further selected from the group consisting of:

parameters relating to devices in the first storage environment;

parameters relating to connectivity between the devices in the first storage environment;

parameters relating to a geographical location of the first storage environment and the devices in the first storage environment;

parameters relating to a purpose and/or industry sector of the first storage environment; and parameters relating to types of workloads which will be handled by the first storage environment and the devices in the first storage environment.

18. The method as recited in claim 17, wherein the parameters relating to the devices in the first storage environment are selected from the group consisting of:

a number of virtual and physical devices in the first storage environment;

a storage capacity of each of the virtual and physical devices in the first storage environment;

a type of each of the virtual and physical devices in the first storage environment; and a speed of each of the virtual and physical devices in the first storage environment.

19. The method as recited in claim 17, wherein the parameters relating to the connectivity between the devices in the first storage environment are selected from the group consisting of:

a number of links between physical devices in the first storage environment;

speed information for each of the links between the physical devices in the first storage environment;

downtime information for each of the links between the physical devices in the first storage environment; and efficiency information for each of the links between the physical devices in the first storage environment.

20. The method as recited in claim 15, wherein the configuration of the first storage environment is determined based on information selected from the group consisting of:

information relating to a local storage management application of the first storage environment;

a number of subsystems in the first storage environment;

firmware information for each device in the first storage environment;

software information for each device in the first storage environment;

encryption information for the first storage environment;

protection information for the first storage environment;

security information for the first storage environment; and backup information for the first storage environment.

* * * * *